United States Patent
Mason (10) Patent No.: US 10,419,451 B2
(45) Date of Patent: Sep. 17, 2019

(54) IDENTIFYING ATTACK PATTERNS IN REQUESTS RECEIVED BY WEB APPLICATIONS

(71) Applicant: salesforce.com, inc., San Francisco, CA (US)

(72) Inventor: Paul Anthony Mason, Port Talbot (GB)

(73) Assignee: salesforce.com, San Francisco, CA (US)

( * ) Notice: Subject to any disclaimer, the term of this patent is extended or adjusted under 35 U.S.C. 154(b) by 273 days.

(21) Appl. No.: 14/936,262

(22) Filed: Nov. 9, 2015

(65) Prior Publication Data

US 2017/0134407 A1 May 11, 2017

(51) Int. Cl.
*H04L 29/06* (2006.01)
*G06F 17/30* (2006.01)
*H04L 29/08* (2006.01)

(52) U.S. Cl.
CPC ...... *H04L 63/1416* (2013.01); *H04L 63/0236* (2013.01); *H04L 63/0245* (2013.01); *H04L 63/1441* (2013.01); *H04L 67/02* (2013.01); *H04L 67/42* (2013.01); *H04L 63/101* (2013.01); *H04L 69/22* (2013.01)

(58) Field of Classification Search
CPC . H04L 63/1416; H04L 67/02; H04L 63/1441; H04L 63/0236; H04L 29/06; H04L 29/08; G06F 17/30864; G06F 17/30887; G06F 17/30
USPC ....................................... 726/1–33
See application file for complete search history.

(56) References Cited

U.S. PATENT DOCUMENTS

| | | | | |
|---|---|---|---|---|
| 6,088,804 A * | 7/2000 | Hill | ....................... | G06F 21/552 726/25 |
| 6,789,119 B1 * | 9/2004 | Zhu | ......................... | H04L 29/06 709/203 |
| 8,601,586 B1 * | 12/2013 | Boutros | .............. | H04L 63/1433 709/217 |
| 2011/0099622 A1 * | 4/2011 | Lee | ......................... | H04L 43/16 726/13 |
| 2015/0170072 A1 * | 6/2015 | Grant | ................... | G06Q 10/067 705/7.36 |
| 2015/0264067 A1 * | 9/2015 | Kim | ..................... | H04L 63/1416 726/23 |

* cited by examiner

*Primary Examiner* — Ashokkumar B Patel
*Assistant Examiner* — Quazi Farooqui
(74) *Attorney, Agent, or Firm* — Fenwick & West LLP (57) ABSTRACT

A system and a method are disclosed for determining malicious web requests. The system processes incoming web requests to determine whether a request matches predetermined patterns of suspicious requests. The systems stores associations between patterns of suspicious requests, parts of the web request where each pattern occurs, and attack type associated with the pattern. If the system determines that an incoming web request matches a pattern of a suspicious request, the system determines whether to forward the request to the web server for processing or to hold the request. The system locks out a source of request for a period of time if the source sends requests that match certain attack patterns.

20 Claims, 3 Drawing Sheets

IDENTIFYING ATTACK PATTERNS IN REQUESTS RECEIVED BY WEB APPLICATIONS

BACKGROUND

Field of Art

The disclosure relates to security of web applications in general and more specifically to identifying attack patterns in requests received by web applications.

Description of the Related Art

Entities such as businesses, enterprises, organizations, and so on use web applications to perform various activities such as promoting their services and products, interacting with users such as current and potential customers, conducting business transactions, and so on. Systems executing such applications typically have access to different types of information including sensitive information such as credit card numbers, social security numbers, private communications, and so on. Malicious users often try to exploit vulnerabilities in the system executing the web applications to gain unauthorized access to the sensitive information.

Systems executing these web applications use various security mechanisms to prevent unauthorized access to information. However, malicious users use a variety of different types of attacks. For example, certain attacks send requests to the servers that are similar to benign requests received by the servers. These requests contain malicious instructions hidden within the requests. These attacks are often not detected due to their similarity to benign requests.

If the system fails to detect malicious requests, the sensitive information of users may get compromised, resulting in potential harm to the business or enterprise. For example, customers may hesitate to provide sensitive information to the businesses and enterprises. Furthermore, customers that do not trust the systems of a business may move to a competing business. As a result businesses and enterprises lose revenue if they are unable to prevent attacks against their systems.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Described embodiments identify potential attacks to a system made via requests to web applications executing on the system, for example, via hypertext transfer protocol (HTTP) requests. The system stores information describing attack patterns that can occur in different parts of an HTTP request. The system identifies different parts of an incoming HTTP request and matches them against the stored patterns. If the system determines that a request matches a stored attack pattern, the system requires further verification of authenticity of the source before processing further requests from the source.

In one embodiment, the system determines the source of the input HTTP request and locks out the source of the input HTTP request for a particular time period. Accordingly, the system does not process requests from the locked out source for the lockout period. After the lockout period if the source again sends a request that matches an attack pattern, the system locks the source out for a longer period of time.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
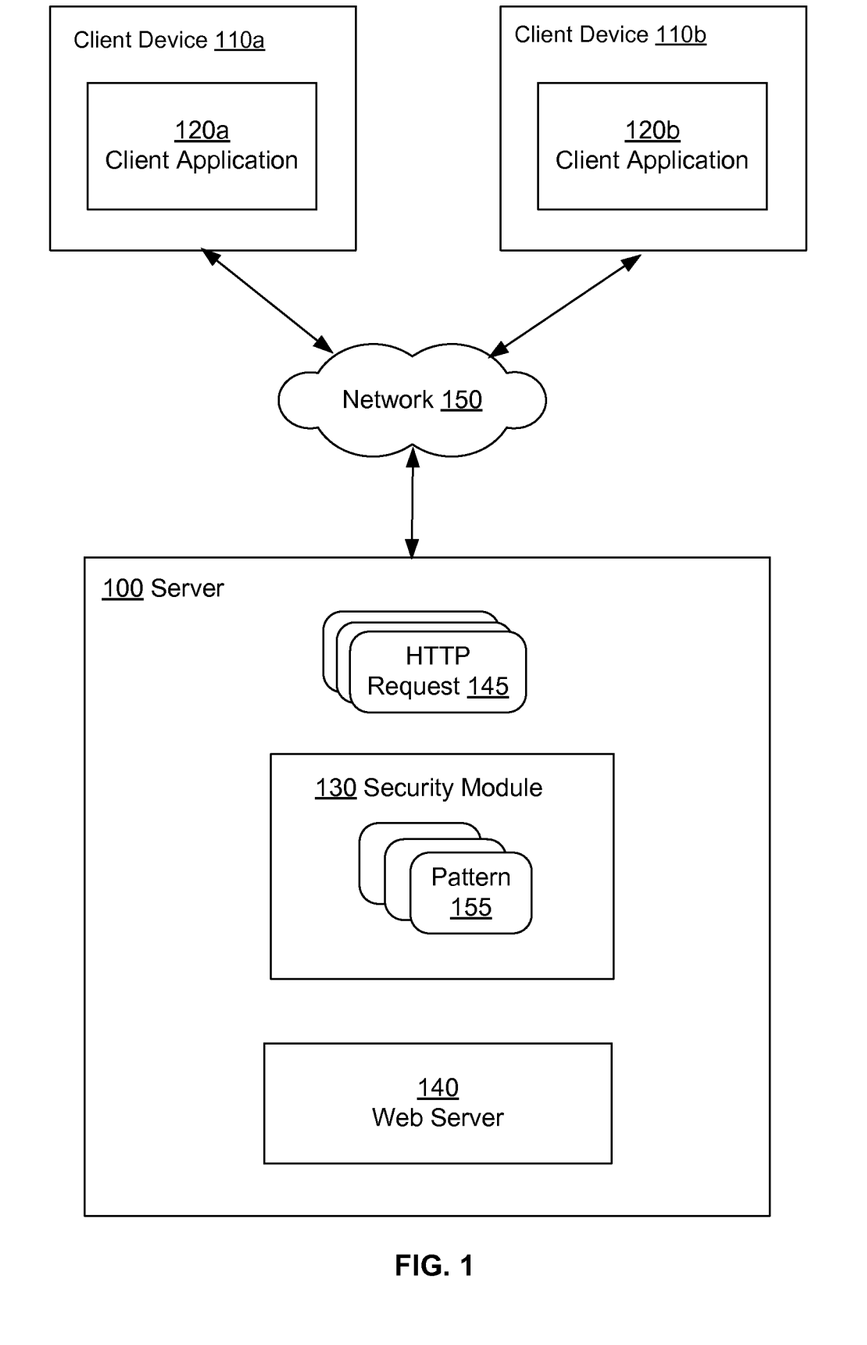
FIG. 1 shows the overall system environment illustrating a server receiving requests from clients and processing them, in accordance with an embodiment of the invention.

FIG. 1 shows an overall system environment illustrating a server receiving requests from clients and processing them, in accordance with an embodiment of the invention. The overall system environment includes a server 100, one or more client devices 110 and a network 150. The server 100 receives requests sent by the client device 110 via the network 150 and processes them. Other embodiments can use more or less or different systems than those illustrated in FIG. 1. Functions of various modules and systems described herein can be implemented by other modules and/or systems than those described herein.

The server 100 executes web applications that receive web requests from client devices 110. The server 100 includes a web server 140 and a security module 130. The web server 140 receives web requests from client devices 110 and processes them. The web server may be an HTTP server. The server 100 includes one or more databases that store information used for processing the HTTP requests received by the server 100. For example, if the server 100 receives and processes requests associated with employees of an enterprise, the server 100 may include databases storing employee information. Alternatively, the databases may be stored on a system separate from the server 100 such that the server 100 has remote access to the databases.

In an embodiment, the server 100 includes an external interface module (not shown in FIG. 1) that allows the web server 140 to interact with external systems to perform requested actions. The external interface module invokes APIs (application program interface) of the external system to send requests and retrieve information from the external system. For example, the external interface module may interact with a payment server to receive and process payments for a transaction.

Web applications include applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Web applications executed by the server 100 include productivity applications, for example, word processing applications, search applications, document viewers, collaboration applications. Web applications executed by the server 100 include applications that allow communication between people, for example, email, messaging, web meetings, and so on.

An HTTP server is a computer-executed process that receives and processes HTTP (hypertext transfer protocol) requests. An HTTP request is a request that conforms to the HTTP protocol. The HTTP protocol can be any version of HTTP or HTTPS protocol, for example, HTTP/1.0, HTTP/1.1, and so on. The requests processed by the web server 140 are not limited to HTTP based protocols and can be requests based on any other web protocol (or internet protocol) such as SOAP (simple object access protocol), XML-RPC (extensible markup language-remote procedure call), WPS (web processing service), and so on.

A client device 110 is used by users to interact with the server 100. A user interacts with the server 100 using client application 120. An example of a client application 120 is a browser application. In an embodiment, the client application 120 interacts with the server 100 using HTTP requests sent over network 150. A client device 110 may be used by a malicious user for sending requests to the server 100 to receive information that the client device 110 is not authorized to receive. For example, the client application 120 may include a database query in the request sent to the server 100 that attempts to extract more information than the client device 120 is authorized to receive.

In an embodiment, the client device 110 represents any entity that sends an HTTP request 145 to the server 100. For example, a malicious computer may send an HTTP request to the server 100 even if the malicious computer is not a client device 110 associated with a user of server 100. A malicious computer may send several different HTTP requests to the server 100 in an attempt to find a weakness in the security of the server 100. A malicious computer may intercept an HTTP request before the HTTP request arrives at the server 100 and modify the HTTP request to receive unauthorized information from the server 100 or to redirect the client device 110 to a malicious website.

FIG. 1 shows server 100 receiving HTTP requests 145 from client devices 110. The server 100 provides the HTTP requests 145 to the web server 140 for execution. The web server 140 typically processes the HTTP requests 145 by determining the type of action requested by the received HTTP request. The web server 140 also identifies various parameters specified in the HTTP requests.

FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*" and/or "110*b*" in the figures).

As an example, assume that a client device 110 sends an HTTP request to the server 100 to perform a sales transaction. An HTTP request may invoke a get method or a post method. An HTTP request may specify one or more parameters as name value pairs. The web server 140 identifies the various parameters of the request, for example, a user id associated with the transaction, one or more products related to the transaction, and so on. The web server 140 invokes one or more software modules storing instructions to perform the requested action.

The security module 130 receives the HTTP requests that are directed towards the web server 140 before the request is processed by the web server 140 and analyzes them to determine whether the requests are malicious. The security module 130 maintains a library of various types of attack patterns. The security module 130 compares the HTTP request received against different types of attack patterns to determine whether the HTTP request is malicious, i.e., whether the request poses a threat to the server 100 or to the client device 110.

If the security module 130 determines that the HTTP request is malicious, the security module 130 takes appropriate action, depending on the type of attack identified by the security module 130. In an embodiment, the security module 130 maintains a mapping from a measure of a severity of threat to a type of action to be performed in response to receiving a request determined to have that measure severity of threat. The security module 130 determines a measure of severity of threat for a request received and takes appropriate action based on the severity of threat. In an embodiment, the mapping is maintained as a table having two columns, a first column storing a representation of the severity of threat and the second column storing a representation of the action. The severity of threat and the actions may be represented as alphanumeric values. The security module 130 further maintains an association from each representation of an action to instructions (or code) corresponding to that action. For example, if the attack is determined to be a serious attack, the security module 130 blocks subsequent requests from the source of the HTTP request until further authentication of the source is performed. If the attack is determined to be not very serious, the security module 130 locks the source out for a particular period of time, thereby rejecting requests from the source for the lockout period.

The server 100 and client devices 110 shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. The server 100 stores the software modules storing instructions for embodiments, for example security module 130.

The interactions between the client devices 110 and the server 100 are typically performed via a network 150, for example, via the Internet. In one embodiment, the network uses standard communications technologies and/or protocols. In another embodiment, the entities can use custom and/or dedicated data communications technologies instead of, or in addition to, the ones described above. The techniques disclosed herein can be used with any type of communication technology, so long as the communication technology supports receiving by the server 100 of web requests from a sender, for example, a client device 110 and transmitting of results obtained by processing the web request to the sender.

System Architecture

Figure 2:
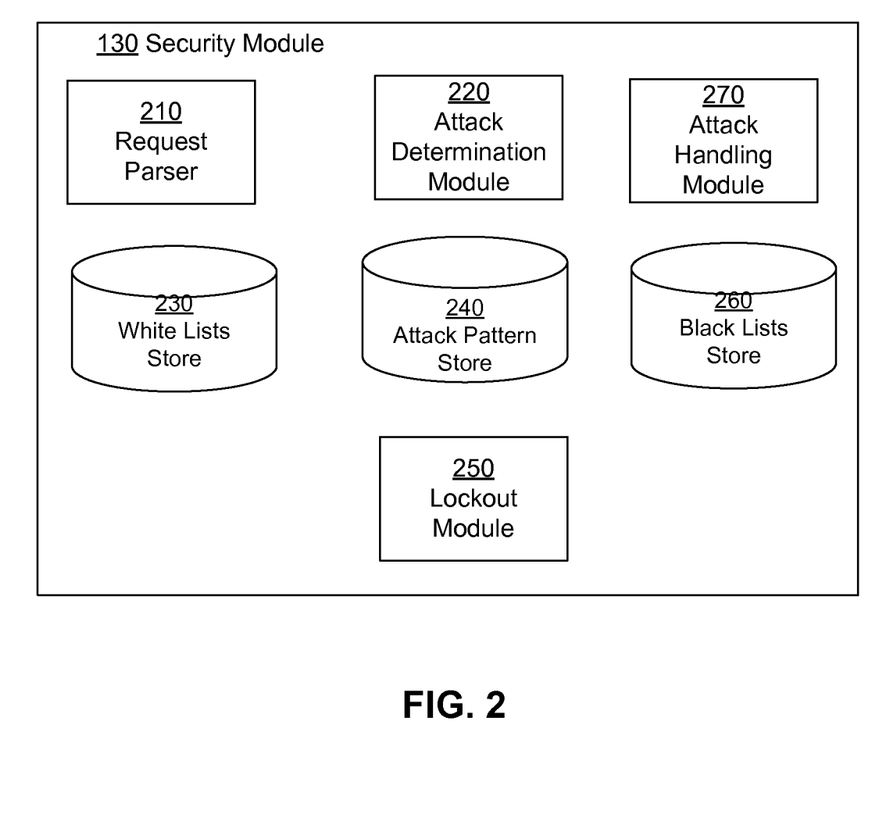
FIG. 2 shows the system architecture of a security module for identifying attack patterns in requests received by web applications, in accordance with an embodiment.

FIG. 2 shows the system architecture of a security module for identifying attack patterns in requests received by web applications, in accordance with an embodiment. The security module 120 includes a request parser 210, an attack determination module 200, a white lists store 230, a black lists store 260, an attack patterns store 240, an attack handling module 270, and a lockout module 250. A security module 120 may include more or fewer modules than those shown in FIG. 2. Furthermore, specific functionality may be performed by different software modules than those described herein.

The request parser 210 parses the web requests received by the server 100 to identify different parts of the request (a part of a request is also referred to herein as a portion of the request or a component of the request.) For example, the request parser determines various parts of an HTTP request corresponding to a header, a body, a query, and so on. The request parser 210 also identifies various parameters provided within the HTTP request. The request parser 210 determines whether any parameter passed to the HTTP request includes executable instructions, for example, script code.

In an embodiment, the request parser 210 includes instructions for generating tokens from individual characters received in a data stream representing the received request. The request parser 210 includes description of rules of a grammar for the HTTP request. The request parser 210 identifies sequences of tokens and determines whether these sequences match certain grammar rules. Based on the matching of the sequences of tokens with grammar rules, the request parser 210 builds a data structure representing the received HTTP request. An example of a data structure used for representing an HTTP request is a parse tree structure. The data structure makes it easy for a computer to determine the various components of the HTTP request.

An HTTP request can include name value pairs where a name identifies a parameter of the request and a value represents the value for the parameter. The value of a parameter may be an alphanumeric string. For example, the value of a parameter may be a string that represents script code. The request parser parses the text received as values of parameters. The request parser 210 determines whether the values of parameters received in a request include script code. In an embodiment, the request parser 210 determines presence of script code within a markup language document by identifying keywords that typically occur in a scripting language. The attack pattern store 240 stores various keywords that typically occur in scripting language. The request parser 210 retrieves the keywords from the attack pattern store 240 to compare with parameter values. For example, the request parser 210 determines that a parameter value includes script code if the tag or attribute includes keywords such as "if", "for", "var", and so on. In other embodiments, the request parser 210 determines that a parameter value includes script code parameter value includes patterns that match phrases of a script language, for example, a for loop, a repeat until loop, a while loop, an if statement, an if-then-else statement, a switch statement, and so on.

The attack pattern store 240 stores information describing characteristics of web requests that correspond to various attack types. In an embodiment, the attack pattern store 240 stores associations between parts of HTTP requests, patterns, and attack types. In an embodiment, the attack pattern store 240 stores tuples, each tuple including information identifying a part of the HTTP request, a pattern, and an attack type. The tuple may include other types of information, for example, a measure of severity of the threat for the attack type. In an embodiment, the attack patterns stored in the attack pattern store 240 are specified using syntax of a proprietary language. An attack pattern may be specified using regular expressions.

The attack determination module 220 receives the representation of the input request generated by the request parser 210, for example, a parse tree representation. The attack determination module 220 matches the information describing the request against the attack patterns stored in the attack pattern store 240. For example, an attack pattern may match an HTTP request including a particular type of SQL statement in the header. The attack determination module checks if the header of the incoming request includes an SQL statement of the type specified in the attack pattern. Similarly, the attack determination module 220 matches parts of the incoming request against attack patterns stored in the attack pattern store 240 to determine whether the incoming request matches any of the attack patterns. In an embodiment, the attack pattern store 240 stores a mapping from attack patterns to attack types and a measure of severity of threat level for the attack type. If the incoming request matches an attack pattern, the attack determination module 220 identifies the attack type associated with the attack pattern and the severity of threat level for the attack type.

The attack handling module 270 handles requests matching an attack pattern. In an embodiment, the attack handling module 270 maintains a mapping from each attack type to a type of action to be taken for that attack type. The attack handling module 270 uses the mapping to determine the type of action to be taken for the request based on the attack type and/or the severity of threat level. The attack handling module 270 processes the appropriate instructions for taking the appropriate action for handling the attack corresponding to the incoming request.

In an embodiment, the attack handling module 270 maintains a mapping from attack patterns to measures of severity of threats. The attack handling module 270 further maintains a mapping from measures of severity of threats to actions to be taken for handling requests having a particular severity threat. For example, for a low severity threat level, the mapping specifies performing enhanced authentication, for a medium severity threat level, the mapping specifies locking out the source of the request for a specified time period, and for a high severity threat level, the mapping specifies adding the source to a black list and blocking requests from that source.

The following Table 1 shows an example of tuples of the attack pattern store 240. In an embodiment, the attack pattern store 240 is a relational database that stores the data shown in Table 1 as a relational table. The attack pattern store 240 stores information describing attack patterns as shown below in Table 1 including information identifying a part of the request (for example, query portion of the request, any portion of the request, header of the request, and so on), the attack pattern, the type of attack, and a measure of severity of threat.

TABLE 1

| Id | Part of Request (location) | Attack pattern | Attack type | Severity of threat |
|---|---|---|---|---|
| 1 | query | <script> | cross site scripting | Low |
| 2 | any | select * from table | SQL injection | High |
| 3 | any | alert( | cross site scripting | Low |

TABLE 1-continued

| Id | Part of Request (location) | Attack pattern | Attack type | Severity of threat |
|---|---|---|---|---|
| 4 | any | href="data:text/ | advanced cross site scripting | Medium |
| 5 | any | WHERE hex_encode | SQL injection | High |
| 6 | any | select if(1=1,'true','false') | SQL injection | High |

As shown in Table 1, the attack determination module 220 matches a request against the attack pattern with id 1 if the "query" part of the request includes a script code indicated in the corresponding attack pattern. Accordingly, the attack determination module 220 determines that the request matches an attack type "cross site scripting" and has low severity of threat. As another example, the attack determination module 220 matches a request against the attack patterns with id 2, if any part of the request includes a SQL query shown in the corresponding attack pattern. Accordingly, the attack determination module 220 determines that the request matches an attack type "SQL injection" and has high severity of threat.

The white lists store 230 stores various types of white lists that identify sources of requests that are determined to be safe (i.e., not malicious). The attack determination module 220 checks whether a source of a request belongs to a white list stored in the white lists store 230 before matching request against the attack patterns stored in the attack pattern store 240. Accordingly, if a system is determined to belong to a whitelist, the attack determination module 220 does not perform the matching against the attack patterns stored in the attack pattern store 240. For example, some systems may be used for testing of the server 100. Accordingly, a system administrator may mark these systems as safe in the white lists store 230. The attack determination module 220 allows requests from these systems to pass through to the web server 140 even if they match certain attack patterns.

In an embodiment, the attack handling module 270 performs additional authentications for request sources that match against attack patterns. The attack determination module 220 determines the source of a request based on information available in the header of the request. In an embodiment, the attack handling module 270 determines that a source that sends HTTP requests including SQL strings of specific types are suspicious (examples of SQL strings determined to be suspicious are presented below.) The attack handling module 270 sends information describing the request source to a system administrator that performs further authentication of the source. Alternatively, attack handling module 270 sends a request for enhanced authentication to the source. Examples of enhanced authentication requested by the attack handling module 270 include requiring the sender of the request to answer certain challenge questions. If the source passes the enhanced authentication, the attack handling module 270 adds the source to a white list.

In an embodiment, the white lists store 230 stores information identifying the source along with information identifying the attack pattern for which the source was authenticated. Accordingly, the attack handling module 270 allows requests from the source if they match the attack pattern associated with the source in the white lists store 230. That is, the security module 130 white lists the source for certain types of attack pattern but not for other attack patterns. If the security module 130 determines that the source sends a request that matches an attack pattern that is different from the attack pattern(s) identified in the white lists store 230 for the source, the attack handling module 270 again marks the source as suspicious and requires the source to pass enhanced authentication.

The black lists store 260 stores information identifying systems that are determined by the server 100 to be malicious. For example, if the security module 130 determines that requests from a source match an attack pattern, attack handling module 270 sends a request for enhanced authentication to the source. If the source fails the enhanced authentication, the attack handling module 270 adds the source to a black list stored in the black lists store 260. In an embodiment, the attack determination module 220 determines sources of incoming requests and compares them against systems stored in black lists store 260. In an embodiment, if the attack determination module 220 determines that the source of request is black listed, the attack handling module 270 rejects the request, i.e., does not forward the request to the web server 140.

The security module 130 may identify the systems in the white lists store 230 and black lists store 260 using identifiers such as IP (internet protocol) addresses of the systems sending the requests. Various web protocols such as HTTP protocol include information identifying the source of the request. The request parser 210 identifies the source of the request from the request and provides to the security module 130 for storing in the white lists store 230 and black lists store 260 if necessary.

In an embodiment, if the attack determination module 220 determines that a request matches an attack pattern, the attack handling module 270 invokes the lockout module 250 to lock out the source of the request for a period of time. The attack determination module 220 provides the attack type of the request and information identifying the source to the lockout module 250. The lockout module 250 maintains information describing locked out sources of requests.

In an embodiment, the lockout module 250 maintains an association between a source of request, a timestamp at which the lockout of the source began, and the length of the lockout period. The lockout module 250 checks periodically if the timestamp of a source of information is older than the lockout period. If the lockout module 250 determines that a source has been locked out for more than the specified lockout time period, the lockout module 250 removes the source from lockout. The lockout module 250 removes a source from lockout by removing the source from the table storing the locked out sources or by using a flag indicating that the source is no longer locked out.

Attack Patterns

The attack pattern store 240 may store various types of attack patterns. In an embodiment, an attack pattern matches if a parameter of an HTTP request includes script code. For example, a parameter of an HTTP request may include code or instructions. The attack determination module 220 identifies a part of the request that corresponds to a parameter based on the protocol used by the request. For example, an HTTP request supports GET and POST methods that specify one or more parameters. Typical request parameters include values rather than code/text. Therefore, the security module 130 determines that a request that includes code/text as a parameter is attempting to execute instructions that the requestor is not authorized to execute. Accordingly, the request matches an attack pattern and may cause the security module 130 to hold the request until further authentication of the source of the request has taken place. In an embodiment, the security module 130 performs further analysis to determine whether the code/text is malicious before holding the request.

The attack pattern store 240 may store an attack pattern that specifies that if certain attributes of certain tags of the request include either a script or a URL (uniform resource locators), the request should be considered suspicious. For example, a request may include a tag that identifies a media file such as an image or a video. The tag for the media file typically includes a source attribute that includes the location of the media file. An HTTP request may include an image tag "img" with a source attribute "src", for example, "<img src="imagefile.png" width="0" height="0"/>". However, if the request includes an image tag with a source attribute that is a URL, the attack determination module 220 determines that the request may be suspicious.

In an embodiment, the security module 130 checks whether the URL specified in the source attribute of the image tag in the request occurs in a white list stored in the white lists store 230. If the security module 130 determines that the URL occurs in a white list, the security module 130 forwards the request for processing to the web server 140. If the security module 130 determines that the URL does not occur in any white list, the security module 130 requires further processing to determine whether the URL specified is safe. For example, the security module 130 may send an alert to a system administrator to determine whether the URL refers to a safe location. If the security module 130 determines that the URL is safe, the security module 130 adds the URL to a white list so that subsequent requests that match this pattern are not considered malicious.

In an embodiment, the security module 130 holds the request until the URL is determined to be safe and then forwards the request for processing once the URL is determined to be safe. In other embodiments, the security module 130 returns an error message to the requestor for the present request indicating the server is unable to process the request but starts processing subsequent requests once the URL is determined to be safe.

In an embodiment, the security module 130 determines whether the request includes a redirect request. For example, the request may include a URL of the form www.xyz.com/redirect.jsp?url=targetwebsite.com. The attack pattern store 240 stores various URL patterns used for redirecting requests. The example URL patterns that match redirect requests may be identified by a system administrator. The security module 130 determines that the request includes a URL matching a redirect request and identifies the target website to which the request is being redirect. The security module 130 checks whether the target website is included in a white list stored in the white lists store 230.

The attack pattern store 240 stores patterns that match database queries embedded within HTTP requests that are likely to be malicious. In an embodiment, the attack pattern store 240 stores patterns matching database queries that are likely to retrieve more information than requested by a typical HTTP request. An example of a SQL query that is likely to retrieve more data than a typical HTTP request retrieves is an SQL query that has a where clause that always evaluates to true. This is so because typically HTTP requests retrieve information about specific records in a database or sets of records in a database, for example, data of a particular user or data of a particular transaction. A database query that is configured to retrieve all data of a table is likely to be suspicious. Accordingly, the attack pattern store 240 stores attack patterns that matches SQL queries having a where clause that always evaluates to a true value. For example, the attack pattern matches SQL queries having a where clause including an expression of the form "N=N", "1=1", or any expression that determines whether a value is equal to the same value. The attack determination module 220 determines that HTTP requests that include queries matching these patterns are suspicious.

The attack determination module 220 matches these attack patterns by determining whether the input request includes a database query. For example, the attack determination module 220 may determine that the input request includes a database query if a portion of the request matches text of the form, keyword "SELECT" followed by keyword "FROM" optionally followed by keyword "WHERE". If the attack determination module 220 determines that the request includes a database query, the attack determination module 220 identifies the condition clause or the where clause of the query. In an embodiment, the attack determination module 220 selects text following the keyword "WHERE" in the query. Other embodiments may specify more detailed patterns for identifying the where clause based on the syntax of the database query. In some embodiments, the request parser 210 is configured to parse various parts of the request including any database queries identified within the request.

The attack determination module 220 parses the expression representing the condition of the where clause of the database query. The attack determination module 220 determines whether the expression representing the condition of the where clause of the database query is an expression or includes a sub-expression that evaluates to a constant value true.

In an embodiment, the URLs identified in the above attack patterns may be included in a black list stored in the black lists store 260. For example, a URL identified in an attribute of an image tag, or a URL of a target website to which a request is being redirected may be determined to occur in a black list. In this case, the security module 130 determines the present request to be malicious and may mark the source of the request as suspicious, pending further verification.

Overall Process

Figure 3:
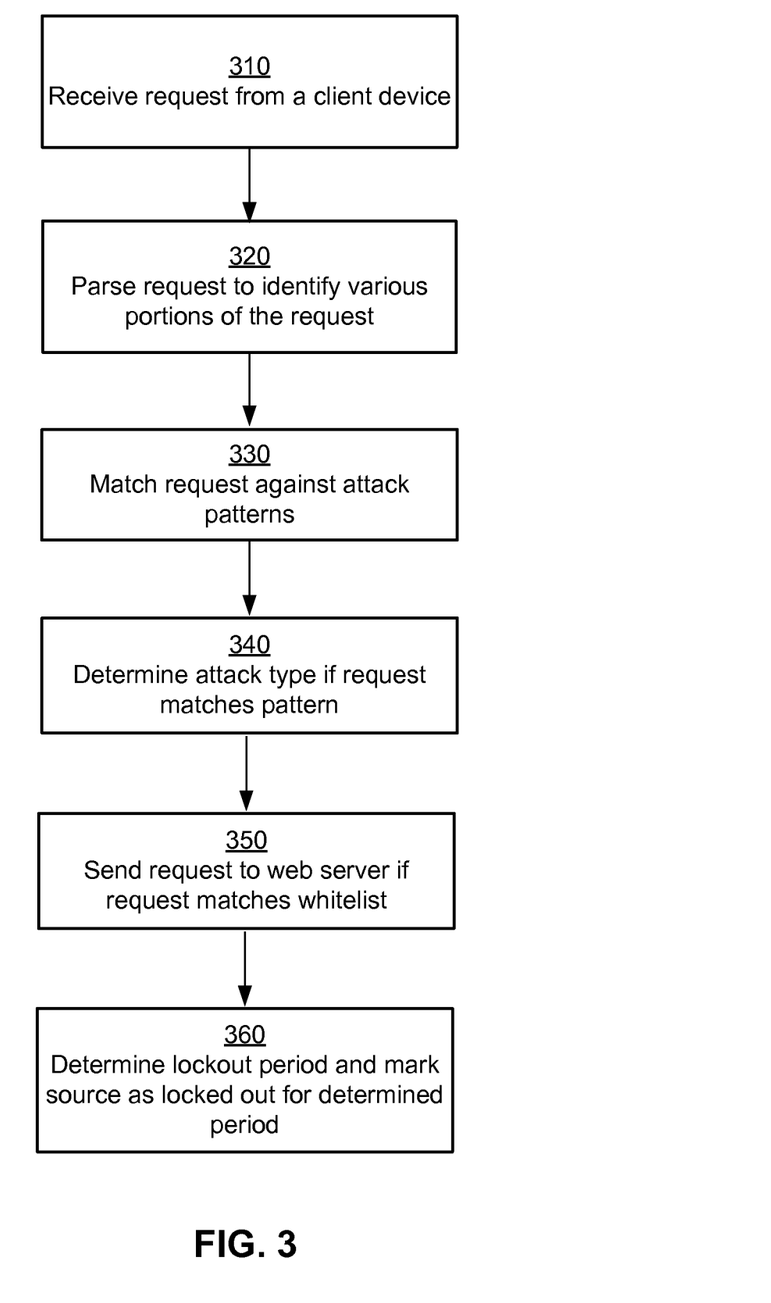
FIG. 3 shows a flowchart illustrating the process for identifying attack patterns in requests received by web applications, in accordance with an embodiment of the invention.

FIG. 3 shows a flowchart illustrating a process for identifying attack patterns in requests received by web applications, in accordance with an embodiment of the invention. The steps described herein can be performed in an order different from those described herein. Furthermore, the steps may be performed by different modules than those described herein.

The security module 130 receives 310 a request from a client device 110, for example, an HTTP request 145. The request parser 210 parses 320 the request to identify various parts of the requests. The request parser 210 also determines information describing various parts of the request, for example, whether certain parts include HTML snippets, whether certain HTML tags include script code, whether a portion of the request includes a database query, such as an SQL (structured query language) query, whether an attribute of an HTML tag includes script code, and so on.

The attack determination module 220 matches 330 the received request against various attack patterns stored in the attack pattern store 240. If the attack determination module 220 determines that the received request matches a particular attack pattern, the attack determination module 220 determines 340 the attack type associated with the attack pattern. For example, the attack determination module 220 may determine that the incoming request matches a cross scripting type of attack, or that the request matches an SQL injection attack.

The attack determination module 220 checks whether the received request is from a source identified in a white list stored in the white lists store 230. If the attack determination module 220 determines that the source is included in a white list, the attack determination module 220 sends 350 the request for processing to the web server 140. If the attack determination module 220 determines that the source is not included in a white list and the request matches an attack pattern, the attack determination module 220 determines 360 a lockout period and sends information identifying the source to the lockout module 250. The attack determination module 220 also rejects the request. In other words, the attack determination module 220 does not send the request to the web server 140 for processing.

The lockout module 250 maintains the status of sources that are locked out. If the security module 130 receives subsequent requests from the same source, the security module 130 checks using the lockout module 250 if the source of the request is locked out. That is, the security module 130 checks whether the subsequent request was received within the lockout period since the source was locked out. If the security module 130 determines that the subsequent request was received within the lockout period, the security module 130 rejects the request. In an embodiment, if the security module 130 receives a subsequent request after the lockout period from the source that matches an attack pattern, the security module 130 locks out the source again for a lockout period that is longer than the previous lockout period.

Alternative Embodiments

Although various embodiments described herein use HTTP request for examples, the techniques disclosed herein apply to various types of web requests based on other protocols that can be processed by the web servers 140. Although example requests are shown as including HTML documents, techniques disclosed herein apply to requests that include other types of markup language documents or snippets, for example, XML documents. Furthermore, techniques disclosed herein apply to script code in any type of scripting language that can be used in web requests. Furthermore, although examples disclosed herein use SQL database queries, techniques disclosed herein apply to other types of database queries using syntax and keywords of the respective database query language.

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A computer implemented method for responding to attacks to a server made via hypertext transfer protocol (HTTP) requests, the method comprising:
    storing a plurality of tuples that characterize HTTP requests that attack the server, each of the tuples specifying:

a location representing a part of an HTTP request,
information identifying a pattern occurring within a part of the HTTP request corresponding to the specified location, wherein the pattern comprises an expression,
an attack type, and
a level of severity of threat;
storing a mapping from each of a plurality of levels of severity of threat to at least one action to be taken for handling a request having the severity of threat of the level, wherein each tuple maps a particular pattern to a particular level of severity of threat responsive to the particular pattern occurring in the part of the HTTP request specified in the tuple;
intercepting an input HTTP request directed to an HTTP server;
parsing the input HTTP request to identify parts of the input HTTP request;
matching the input HTTP request against one or more tuples from the plurality, the matching comprising:
identifying a part of the input HTTP request corresponding to the location specified in the tuple;
determining that the pattern specified in the tuple occurs in the identified part of the HTTP request corresponding to the location specified in the tuple by matching the data of the identified part of the input HTTP request with the expression corresponding to the pattern specified in the tuple; and
responsive to determining that the pattern specified in the tuple occurs in the identified part of the HTTP request corresponding to the location specified in the tuple, identifying the tuple as a matching tuple for the input HTTP request;
responsive to identifying the matching tuple, determining a level of severity of threat for the input HTTP request from the level of severity of threat of the matching tuple; and
responsive to determining the severity of threat, performing the at least one action based on the severity of threat, comprising at least one of performing enhanced authentication, locking out a source of the input HTTP request for a specified time period, blocking the processing of the input HTTP request, and blacklisting the source of the input HTTP request.

2. The method of claim 1, wherein the input HTTP request is determined to be of the attack type specified in the tuple if the input HTTP request matches the pattern of the tuple.

3. The method of claim 1, further comprising:
determining a lockout period for the source of the HTTP request based on the attack type of the matching tuple; and
responsive to receiving a subsequent HTTP request from the source, blocking the subsequent request from reaching the HTTP server if the subsequent request is received within the lockout period.

4. The method of claim 3, wherein the lockout period is a first lockout period, further comprising:
receiving a subsequent HTTP request after the first lockout period;
determining whether the subsequent request matches the attack type; and
responsive to the subsequent request matching the attack type, determining a second lockout period greater than the first lockout period and blocking HTTP requests from the source for the second lockout period.

5. The method of claim 1, further comprising:
determining a number of HTTP requests matching an attack type received within a time period from a source;
comparing the number of HTTP requests matching the attack type received from the source with a threshold value; and
determining that the source is suspicious if the number of HTTP requests matching the attack type received from the source exceeds the threshold value.

6. The method of claim 1, wherein the pattern of the matching tuple specifies a script code occurring within an HTML tag of the input request.

7. The method of claim 1, wherein the pattern of the matching tuple specifies a script code occurring within a parameter of the request.

8. The method of claim 1, wherein matching the input request against a pattern specified in a tuple comprises:
determining that the request is performing a redirect; and
determining whether a target website to which the redirect is performed is safe.

9. The method of claim 8, wherein determining whether the target web site is safe comprises checking whether the target website occurs within a whitelist of websites previously determined to be safe.

10. The method of claim 1, wherein matching the input request against a pattern specified in a tuple comprises:
identifying an attribute of a tag; and
determining whether a value of the attribute of the tag that occurs in the input HTTP request is a URL.

11. The method of claim 10, wherein the tag identifies a media file and the attribute of the tag specifies a location of the media file.

12. The method of claim 10, further comprising:
determining whether the URL representing the location is a safe URL.

13. The method of claim 12, wherein determining whether the URL is safe comprises checking whether URL occurs within a whitelist of URLs previously determined to be safe.

14. The method of claim 1, wherein matching the input request against a pattern specified in a tuple comprises:
determining whether the request includes a database query;
identifying a condition clause of the database query; and
determining whether the condition clause comprises an expression that always evaluates to a constant true value.

15. The method of claim 14, wherein determining whether the condition clause evaluates to a constant true value comprises identifying a portion of the condition clause containing an expression that compares a particular constant value with the particular constant value.

16. A computer readable non-transitory storage medium storing instructions for:
storing a plurality of tuples that characterize HTTP requests that attack the server, each of the tuples specifying:
a location representing a part of an HTTP request,
information identifying a pattern occurring within a part of the HTTP request corresponding to the specified location, wherein the pattern comprises an expression,
an attack type, and
a level of severity of threat;
storing a mapping from each of a plurality of levels of severity of threat to at least one action to be taken for handling a request having the severity of threat of the level, wherein each tuple maps a particular pattern to a particular level of severity of threat responsive to the particular pattern occurring in the part of the HTTP request specified in the tuple;

intercepting an input HTTP request directed to an HTTP server;

parsing the input HTTP request to identify parts of the input HTTP request;

matching the input HTTP request against one or more tuples from the plurality, the matching comprising:
identifying a part of the input HTTP request corresponding to the location specified in the tuple;
determining that the pattern specified in the tuple occurs in the identified part of the HTTP request corresponding to the location specified in the tuple by matching the data of the identified part of the input HTTP request with the expression corresponding to the pattern specified in the tuple; and
responsive to determining that the pattern specified in the tuple occurs in the identified part of the HTTP request corresponding to the location specified in the tuple, identifying the tuple as a matching tuple for the input HTTP request;

responsive to identifying the matching tuple, determining a level of severity of threat for the input HTTP request from the level of severity of threat of the matching tuple; and responsive to determining the severity of threat, performing the at least one action based on the severity of threat, comprising at least one of performing enhanced authentication, locking out a source of the input HTTP request for a specified time period, blocking the processing of the input HTTP request, and blacklisting the source of the input HTTP request.

17. The computer readable non-transitory storage medium of claim 16, wherein the input HTTP request is determined to be of the attack type specified in the tuple if the input HTTP request matches the pattern of the tuple, further comprising:
determining a lockout period for the source of the HTTP request based on the attack type of the matching tuple; and
responsive to receiving a subsequent HTTP request from the source, blocking the subsequent request from reaching the HTTP server if the subsequent request is received within the lockout period.

18. The computer readable non-transitory storage medium of claim 17, wherein the lockout period is a first lockout period, the method further comprising:
receiving a subsequent HTTP request after the first lockout period;
determining whether the subsequent request matches the attack type; and
responsive to the subsequent request matching the attack type, determining a second lockout period greater than the first lockout period and blocking HTTP requests from the source for the second lockout period.

19. The computer readable non-transitory storage medium of claim 16, further comprising:
determining a number of HTTP requests matching an attack type received within a time period from a source;
comparing the number of HTTP requests matching the attack type received from the source with a threshold value; and
determining that the source is suspicious if the number of HTTP requests matching the attack type received from the source exceeds the threshold value.

20. A computer-implemented system for managing information technology (IT) resources of an enterprise, the system comprising:
a computer processor; and
a computer readable non-transitory storage medium storing instructions thereon, the instructions when executed by a processor cause the processor to perform the steps of:
storing a plurality of tuples that characterize HTTP requests that attack the server, each of the tuples specifying:
a location representing a part of an HTTP request,
information identifying a pattern occurring within a part of the HTTP request corresponding to the specified location, wherein the pattern comprises an expression,
an attack type, and
a level of severity of threat;
storing a mapping from each of a plurality of levels of severity of threat to at least one action to be taken for handling a request having the severity of threat of the level, wherein each tuple maps a particular pattern to a particular level of severity of threat responsive to the particular pattern occurring in the part of the HTTP request specified in the tuple;
intercepting an input HTTP request directed to an HTTP server;
parsing the input HTTP request to identify parts of the input HTTP request;
matching the input HTTP request against one or more tuples from the plurality, the matching comprising:
identifying a part of the input HTTP request corresponding to the location specified in the tuple;
determining that the pattern specified in the tuple occurs in the identified part of the HTTP request corresponding to the location specified in the tuple by matching the data of the identified part of the input HTTP request with the expression corresponding to the pattern specified in the tuple; and
responsive to determining that the pattern specified in the tuple occurs in the identified part of the HTTP request corresponding to the location specified in the tuple, identifying the tuple as a matching tuple for the input HTTP request;
responsive to identifying the matching tuple, determining a level of severity of threat for the input HTTP request from the level of severity of threat of the matching tuple; and
responsive to determining the severity of threat, performing the at least one action based on the severity of threat, comprising at least one of performing enhanced authentication, locking out a source of the input HTTP request for a specified time period, blocking the processing of the input HTTP request, and blacklisting the source of the input HTTP request.

* * * * *